Patented Dec. 13, 1949

2,491,054

UNITED STATES PATENT OFFICE 2,491,054

LUBRICATING GREASE

Arnold J. Morway, Clark, N. J., assignor to Standard Oil Development Company, a corporation of Delaware No Drawing. Application October 25, 1947, Serial No. 782,225

10 Claims. (Cl. 252—42)

The present invention relates to lubricating grease compositions and particularly to an improved grease lubricant which is suitable for the lubrication of ball bearings and other antifriction bearings running at both high and low temperatures. In addition the present invention pertains to a water insoluble grease which is stable to mechanical working and free from evaporation and oil leakage in antifriction bearings running at high speeds and at elevated temperatures.

In a previous copending application, Serial No. 570,784, filed jointly by John C. Zimmer and the present inventor on December 30, 1944, now Patent No. 2,436,347, issued February 17, 1948, there was disclosed a low temperature grease having unusual temperature stability characteristics compounded from the esters of aliphatic dibasic acids, particularly those esters in which the esterifying radical is a branched chain alkyl radical.

The present invention involves the discovery that compositions of the general type described in the prior application referred to above may be improved for high temperature use in antifriction bearings by the addition of particular polymer compositions which serve to stabilize the lubricants against ester separation or leakage, to thicken them to some extent and to improve adhesion to metallic surfaces thus tending to hold the lubricant in place under adverse conditions.

In the past, various grease compositions have been proposed for high temperature use and some of them are very satisfactory under certain conditions. Some of the sodium soap base greases, for example, are quite satisfactory for use in antifriction bearings at moderately high temperatures provided that they are not subjected to moisture. In the presence of moisture, however, sodium soaps are leached out of greases, permitting oil separation and resulting in lubricant failure.

The present invention contemplates the use of various metallic soaps as thickeners, although the lithium soaps are preferred. It has been known in the prior art that certain lithium soap base greases have superior properties for antifriction bearing lubrication under wet conditions or high humidity in that they are largely water insoluble. Greases of this type, however, using ordinary mineral base lubricating oils as the lubricating ingredient are not sufficiently stable for use at particularly high temperatures, for example, temperatures of the order of 300° F. This is particularly true when the parts to be lubricated are driven at extremely high speed. For example, in ball bearing units driven at several thousand R. P. M. at temperatures of the order of 300° F. a very common result is the breakdown of the grease with oil leakage and eventual failure due to excessive evaporation of the volatile mineral oil constituent and the formation of rubbery elastic soap. Moreover, these greases cannot be used at temperatures below —65° F. because of the freezing or solidification of the mineral oil.

It is, therefore, an object of my invention to compound a lubricant which is stable at high temperatures, which retains its grease structure over wide temperature ranges without becoming unduly thick and heavy at low temperatures, or rubbery and elastic at high temperatures, and preferably without being adversely affected by the presence of moisture. These and other objects will become more apparent as this description proceeds.

The esters of aliphatic dibasic acids, especially those wherein the esterifying radical is a branched chain alkyl group, have excellent lubricating properties together with certain properties which make them superior to mineral oil fractions for certain uses. They possess unusually high boiling and flash points and, of course, have relatively low vapor pressures even at elevated temperatures. They have high viscosity indices and very low pour points and are chemically stable to a very satisfactory degree.

Of the esters mentioned above, those derived from sebacic, azelaic, phthalic, malonic, succinic, and other related acids have been found to be satisfactory. Specifically, a dibasic ester, such as di-2-ethylhexyl sebacate, isobutyl sebacate, diethylhexyl azelate, diamyl sebacate, dibutyl phthalate, and the like, is quite suitable for the purpose.

In general, any acid or mixture of acids having the general formula, $HOOC(R)COOH$, may be used where R is a bivalent aliphatic hydrocarbon radical. For example, synthetic acids produced by dimerization or polymerization of unsaturated fatty acids or their esters may be employed. The various other esters specifically listed in the above-mentioned patent of Zimmer and Morway may be employed. The esters may be either simple or mixed esters, and they may have various substituents or functional groups, such as Cl, Br, $NH_2$, NHR, RN, $R_2$, CHO, CO, SH, SR, RSSR, ROR, and RO-metal. These esters may be made by any of the methods known to the prior art.

A further and particular aspect of the present invention which is considered distinctive is the addition to a grease of metallic soap base, preferably a lithium soap grease, having the soap thickener dispersed in a dibasic ester of the type described above, of a copolymer which imparts excellent temperature-viscosity properties to the grease. An example of such a polymer is the copolymer of styrene and isobutylene which is described in some detail in the patent to Smyers, No. 2,274,749, issued March 3, 1942. As described in said patent, the polymer may be produced as a viscous liquid or as a plastic solid having a molecular weight range which may be varied over wide limits. For the purposes of the present invention a copolymer having an approximate molecular weight in the range from about 8,000 to about 50,000, for example about 30,000, is preferred although the weight range may be varied from as low as 1000 to as high as 100,000 or more.

By the incorporation of the styrene-isobutylene copolymer in a grease of the general character described, preferably a lithium soap dibasic-ester grease in quantities of 1 to 25% preferably about 5% by weight, based on the final composition, desirable properties are imparted to the grease. The styrene-isobutylene copolymer imparts a stable structure which is not affected by the manner in which the grease is cooled after being heated in the process of preparation. In the absence of such a copolymer lithium soap greases must be cooled at a rapid rate, preferably with continued agitation, to obtain optimum yield, stability to mechanical working, and resistance to ester separation. The copolymer also has a desirable thickening effect, greases of the same consistency being obtained with a lower soap concentration when the copolymer is used. The copolymer also improves the adhesive properties of the grease to metallic surfaces. This is of considerable importance as it greatly reduces spatter of the grease when parts being lubricated are subjected to sudden shocks. Greases which spatter easily are rapidly lost in service under conditions where sudden or intermittent vibrations occur frequently.

As an example of a grease composition prepared according to the present invention, the following is cited:

EXAMPLE I

A composition was prepared having the following ingredients in the weight percentages indicated:

|  | Per cent |
|---|---|
| Styrene-isobutylene copolymer of approximately 20,000 molecular weight (ratio of styrene/isobutylene by weight 40/60) | 5.0 |
| Lithium stearate | 15.0 |
| Oxidation inhibitor (phenyl alpha naphthylamine) | 1.0 |
| 2,6 di-tertiary butyl-p-cresol | 0.4 |
| Di-2-ethylhexyl sebacate | 78.6 |

The styrene-isobutylene copolymer was dissolved in the ester by heating and stirring prior to incorporating the soap into the grease. If desired, however, it may be added during the manufacture of the grease. In the latter case, the copolymer and the soap are added substantially simultaneously to the ester and thoroughly mixed. Heating is started while stirring is continued and the temperature is raised gradually to 400° F. At this temperature the grease becomes a fluid homogeneous mass.

The hot fluid grease is next cooled in any conventional manner. It may be cooled by pouring it into pans in shallow layers and permitting it to set, the cooled grease being substantially homogenized by working in a grease kettle or by milling or working in other known manners. It is preferred, however, that the grease be quickly cooled by working in a double-walled kettle cooled by a water jacket, or by passing it through a water-jacketed cooler equipped with mixing apparatus, such as is used in recently developed continuous processes for grease manufacture.

The grease prepared according to Example I above was tested on a NLGI-ABEC high speed ball bearing test spindle at 300° F. operated at 10,000 R. P. M. The grease tested lasted for 365 hours of operation under the conditions described. The spindle was run continuously for 22 hours at 300° F. and then was stopped and the bearing cooled to room temperature for 2 hours after which the cycle was repeated. During this entire test there was no significant ester or grease leakage from the test bearing.

A grease prepared according to Example I, incorporating 5% by weight of the styrene-isobutylene copolymer and 15% of lithium soap, based on the total composition, had approximately the same worked consistency as determined by a penetrometer as a similar grease containing 20% lithium soap with no copolymer. In other words, the addition of 5% of the copolymer replaced, in thickening effect, an equivalent percentage of lithium soap.

The inspection characteristics of one of the esters used, di-2-ethylhexyl sebacate, with and without 5% of the styrene-isobutylene copolymer are shown in Table I.

*Table I*

| Inspection | Di-2-Ethylhexyl Sebacate | Di-2-Ethylhexyl Sebacate+5.0% Styrene-Isobutylene-Copolymer of 20,000 molecular weight |
|---|---|---|
| Flash °F | 450 | 450 |
| Kin. Viscosity/100° F | 12.64 | 70.86 |
| Kin. Viscosity/210° F | 3.31 | 16.153 |
| Slope [1] | 0.703 | 0.455 |
| Pour °F | −90 | −90 |

[1] Actual slope of line of viscosity at various temperatures (ASTM Standard Viscosity-Temperature Chart D-341-39).

It will be noted that the low pour point and the high flash point of the ester were not changed by the addition of the copolymer. The kinematic viscosity, however, was increased considerably at 210° F., with the result that the slope of the viscosity-temperature curve was improved, and a product having excellent low temperature properties was obtained.

For purposes of comparison with the grease of Example I another composition was prepared. As in the previous example percentages are by weight:

EXAMPLE II

|  | Per cent |
|---|---|
| Lithium stearate | 20.0 |
| Phenyl alpha naphthylamine | 1.0 |
| 2,6 di-tertiary butyl-p-cresol | 0.4 |
| Di-2-ethylhexyl sebacate | 78.6 |

Under test conditions similar to those to which the grease of Example I was subjected, it was found that the grease of Example II was not as adhesive to metal surfaces and therefore did not remain in place in the bearing as well. After 300 hours at 300° F. and 10,000 R. P. M. the lubricant broke down and the bearing failed. The grease containing 20.0% lithium stearate had approximately the same penetration characteristics after mechanical working as the grease of Example I which contained 5% of copolymer and 5% less lithium soap.

The results obtained upon submission of the two greases of Examples I and II to the tests outlined in the Government specifications AN-G-25 and AN-G-5a are shown below in Table II.

tiary butyl-p-cresol may be employed. On the other hand such additives may be omitted alto-

*Table II*

| Tests | Desirable Properties | Properties of the Greases | |
|---|---|---|---|
| | | Example I | Example II |
| Odor | None other than that of ester | None | None. |
| Homogeneity | Completely homogeneous | Passed | Passed. |
| Corrosion on copper | No evidence of pitting or etching after 24 hours at 212° F. | Like original polished copper strip—no discoloration or etching or pitting. | Same. |
| Dropping point | 300° F | 360° F | 360° F. |
| Penetration (Worked) | 265 to 340 | 300 | 300. |
| Worker test | Not greater than 375 penetration after 100,000 strokes with special worker plate. | 335 | 340. |
| Water resistance | Not more than 50% washed out of bearing | 2% loss | 2% loss. |
| Mixmaster test | Not liquefied, or increased in volume more than 15%. | 2.0% increase in volume. | 2.5%. |
| Low temperature torque | Bearing shall turn in less than 10 seconds at 2000 gram centimeters applied torque at —67° F. | 5 seconds | 4 seconds. |
| High temperature performance | 300 hours at 300° F. at 10,000 R. P. M | 365 hours | 300 hours. |
| Oxidation | Norma Hoffmann Bomb Test—not more than 5 pounds drop in pressure in 100 hours (210° F. Original oxygen pressure 110 p. s. i.). | 400 hours—no drop in pressure. | 400 hours—no drop. |

As can be seen from the table the two greases exhibited similar properties except in the high temperature performance test. There the copolymer-containing grease lasted for 365 hours compared to 300 hours for the grease without the copolymer. At the elevated temperature of 300° F. this difference in life represents a marked improvement. High temperature greases, which are usually prepared from high viscosity mineral oils (residual stock or bright stock) and soda soap, generally have very poor low temperature characteristics. Greases prepared using a dibasic ester of the type described above rather than the usual mineral oil work well at low temperatures, but are subject to ester leakage at high temperatures. Moreover, they do not adhere to metallic surfaces as well as could be desired. The addition of a copolymer of styrene and isobutylene to ester-base greases improves their performance in high temperature service while not impairing their good low temperature properties. The soap may be derived from various metals and from various fatty acids and mixtures thereof, although lithium stearate or the lithium soap of fully saturated fish oil acids is preferred. In general, my invention contemplates the use of all proportions of soaps, especially lithium soaps, which are commonly considered suitable for grease manufacture, for example, from as little as 3% to a maximum of about 35%, 25% being the usual upper limit, based on the total composition. Although lithium soap has been employed as an example, my invention is not to be construed as limited to the use of lithium soaps. The advantages of good performance at both high and low temperatures are also obtained to a large degree when using soaps of other metals commonly utilized in grease working such as calcium, sodium, and aluminum, in conjunction with a dibasic ester and a copolymer of styrene and isobutylene. The copolymer preferably is composed of 40 to 60% by weight of styrene and 60 to 40% of isobutylene. The preferred material has an intrinsic viscosity greater than about 0.6 and a molecular weight range of the order of about 30,000 but the molecular weight may be varied from about 1000 to about 100,000.

Various oxidation inhibitors, detergents, oiliness agents, corrosion inhibitors, and the like, may be employed as is well known to those skilled in the art. Thus in the examples given above, phenyl alpha naphthylamine and/or 2,6 di-tertiary butyl-p-cresol may be employed. On the other hand such additives may be omitted altogether or may be substituted or supplemented by various other additives including extreme pressure compositions if desired. Quantities of these additives may be varied between limits which are well known to those skilled in the art and it will be understood that the following claims comprehend the optional use of such materials in minor quantities whether specified or not.

Ordinarily the liquid ester lubricant will compose the major part of the grease, a preferred range being from 70 to 90% by weight, based on the total composition. However, the invention includes also the very stiff greases and the very soft greases and the percentage of dibasic acid ester may vary between about 50 and 97% by weight. The liquid lubricant need not be entirely of ester as a mixture of the ester and mineral oil is quite satisfactory. The proportions of oil and ester may vary from 10% to 80% oil and 90% to 20% ester for the liquid portion of the lubricant, prior to thickening.

As indicated above, the soap and copolymer content may vary rather widely, a particular preferred range for the copolymer being approximately 5%. As indicated in Example II a fairly satisfactory grease is obtained without the use of any copolymer but the use of at least a small amount is preferred.

I claim:

1. A lubricating composition consisting essentially of a lubricating liquid comprising 20 to 90% by weight, based on said liquid of a dibasic acid ester, said liquid being thickened to a grease-like consistency by the use of 3 to 35% by weight, based on the total composition, of a metal soap of a fatty acid, and about 5 to 25% of a copolymer of styrene and isobutylene having a styrene content of 40 to 60% by weight, an intrinsic viscosity of at least 0.6, and a molecular weight between 1,000 and 100,000.

2. A lubricating composition having substantially the following formula:

| | Per cent |
|---|---|
| Styrene-isobutylene copolymer of 40 to 60% styrene content by weight, intrinsic viscosity of at least 0.6, and approximately 20,000 molecular weight | 5.0 |
| Lithium stearate | 15.0 |
| Oxidation inhibitor | 1.0 |
| 2,6 di-tertiary butyl-p-cresol | 0.4 |
| Di-2-ethylhexyl sebacate | 78.6 |

3. A lubricating composition consisting essentially of isobutyl sebacate containing 3 to 25% by weight, based on the total composition, of a lithium soap of a substantially saturated fatty acid and about 5 to 25% of a copolymer of styrene and isobutylene having a styrene content of 40 to 60% by weight, an intrinsic viscosity of at least 0.6 and a molecular weight between 1,000 and 100,000.

4. A lubricating composition consisting essentially of a liquid lubricant comprising a substantial proportion of dibutyl phthalate, said liquid lubricant being thickened to a grease consistency by 3 to 25% by weight, based on the total composition, of a metal soap of a substantially saturated fatty acid and about 5 to 25% of a copolymer of styrene and isobutylene having a styrene content of 40 to 60% by weight, an intrinsic viscosity of at least 0.6 and a molecular weight between 1,000 and 100,000.

5. A lubricating composition consisting essentially of 50 to 92% by weight of a liquid lubricant comprising a substantial proportion of an ester of sebacic acid, 3 to 25% of lithium stearate and about 5 to 25% of a copolymer of styrene and isobutylene having a styrene content of 40 to 60% by weight, an intrinsic viscosity of at least 0.6 and a molecular weight of about 30,000.

6. A lubricating grease composition comprising 50 to 92% by weight, based on the total composition, of a dibasic acid ester lubricant, 3 to 35% of a metal soap and about 5 to 25% of a styrene-isobutylene copolymer containing 40 to 60% styrene by weight and having an intrinsic viscosity greater than 0.6 and a molecular weight between 8,000 and 50,000.

7. A lubricating grease composition consisting essentially of a liquid lubricant comprising a substantial proportion not less than 20% by weight of a dibasic acid ester, 3 to 25% by weight, based on the total composition, of a metal soap of substantially saturated fatty acid for thickening said liquid lubricant to a grease consistency, and about 5 to 25% of a copolymer of styrene and isobutylene composed of 40 to 60% by weight of styrene and having an intrinsic viscosity greater than about 0.6 and a molecular weight between 8000 and 50,000.

8. A composition as in claim 7 wherein said dibasic acid ester is di-2-ethylhexyl sebacate.

9. A composition as in claim 7 wherein said dibasic acid ester is dibutyl phthalate.

10. A composition as in claim 7 wherein said metal soap is lithium soap of substantially saturated hydrogenated fish oil acids.

ARNOLD J. MORWAY.

REFERENCES CITED

The following references are of record in the file of this patent:

UNITED STATES PATENTS

| Number | Name | Date |
|---|---|---|
| 2,084,500 | Otto et al. | June 22, 1937 |
| 2,213,423 | Wiezevich | Sept. 3, 1940 |
| 2,274,749 | Smyers | Mar. 3, 1942 |
| 2,282,456 | Christmann et al. | May 12, 1942 |
| 2,421,082 | Pier et al. | May 27, 1947 |
| 2,436,347 | Zimmer et al. | Feb. 17, 1948 |
| 2,448,567 | Zisman et al. | Sept. 7, 1948 |

OTHER REFERENCES

Hain et al.: "Synthetic Low Temperature Greases from Aliphatic Diesters," article in Industrial and Engineering Chemistry, vol. 39, April 1947, pages 500–506.